(12) United States Patent
Kim et al.

(10) Patent No.: US 7,440,642 B2
(45) Date of Patent: Oct. 21, 2008

(54) INTEGRATED OPTICAL MODULATOR AND METHOD FOR MANUFACTURING THE SAME

(75) Inventors: Woo Kyung Kim, Seongnam-si (KR); Woo Seok Yang, Seongnam-si (KR); Han Young Lee, Yongin-si (KR); Hyung Man Lee, Hwaseong-si (KR)

(73) Assignee: Korea Electronics Technology Institute, Gyeonggi-Do (KR)

( * ) Notice: Subject to any disclaimer, the term of this patent is extended or adjusted under 35 U.S.C. 154(b) by 0 days.

(21) Appl. No.: 11/304,031

(22) Filed: Dec. 15, 2005

(65) Prior Publication Data

US 2007/0036478 A1    Feb. 15, 2007

(30) Foreign Application Priority Data

Aug. 12, 2005    (KR)    ............... 10-2005-0074320

(51) Int. Cl.
| | |
|---|---|
| G02F 1/035 | (2006.01) |
| G02F 1/01 | (2006.01) |
| G02F 1/295 | (2006.01) |
| G02F 1/23 | (2006.01) |
| G02F 1/03 | (2006.01) |
| G02F 1/07 | (2006.01) |

(52) U.S. Cl. ............... 385/3; 385/1; 385/2; 385/8; 359/245; 359/276; 359/278; 359/279

(58) Field of Classification Search ........... 385/1–5, 385/8, 9; 359/245, 276, 278, 279
See application file for complete search history.

(56) References Cited

U.S. PATENT DOCUMENTS

| | | | |
|---|---|---|---|
| 1,666,206 | A | 4/1928 | Hartley |
| 5,278,924 | A * | 1/1994 | Schaffner ............ 385/3 |
| 5,526,158 | A | 6/1996 | Lembo |
| 6,501,867 | B2 | 12/2002 | Gates, II et al. |
| 2002/0149826 | A1 * | 10/2002 | Tanaka et al. .......... 359/181 |

* cited by examiner

*Primary Examiner*—Kevin S Wood
*Assistant Examiner*—John M Bedtelyon
(74) *Attorney, Agent, or Firm*—Thomas, Kayden, Horstemeyer & Risley

(57) ABSTRACT

An integrated optical modulator and method for manufacturing thereof are disclosed. The integrated optical modulator comprises a carrier wave band modulator using a double sideband modulation method and an intermediate frequency band modulator using a single sideband modulation method. The carrier wave band modulator and the intermediate frequency band modulator are connected in series. A method for manufacturing an integrated optical modulator comprises preparing a substrate having at least one polarization reversed section, forming a first optical waveguide part and a second optical waveguide part on the substrate, forming a buffer layer over the first and second optical waveguide parts, forming sequentially a first electrode part and a second electrode part over the first optical waveguide part, and forming a third electrode part over the second optical waveguide part.

6 Claims, 5 Drawing Sheets

(a) chirp parameter (b) phase difference (c) sideband suppression

INTEGRATED OPTICAL MODULATOR AND METHOD FOR MANUFACTURING THE SAME

BACKGROUND OF THE INVENTION

1. Field

The present invention relates to an integrated optical modulator; and, more particularly, to an integrated optical modulator including a carrier wave band modulator using a double sideband modulation method and intermediate frequency band modulator using a single sideband modulation method, which is free from chromatic dispersion.

2. Background

With an explosive increase in demand for wireless communication equipment and information, a new information communication environment is strongly required so as to transmit and receive data of more than hundreds of Mbps. Such broadband transmission necessitates a carrier wave having dozens of GHz. Particular, 60 GHz band, which is readily absorbed by oxygen, is being greatly noticed as a carrier wave in view of frequency recycling.

There are several techniques for transmitting signals to wireless communication equipment. One technique is intermediate frequency (IF) over fiver (hereinafter referred to as "IOF") or baseband over fiber (hereinafter referred to as "BOF") which is the way that transmits data to a base station and then modulates a carrier wave with the date signal to transmit a modulated carrier wave in the base station. Another technique is radio frequency over fiber (hereinafter referred to as "ROF") which is the way that transmits a carrier wave modulated by using a data signal to a base station and then transmits directly radio frequency (RF) regenerated by a high-efficiency photodiode in the base station. Such communication to a base station is carried out by using an optical fiber with broadband and low loss characteristics. Particularly, in a circumstance requiring a large number of base stations due to short-haul, high capacity transmit/receive characteristics of a high frequency, ROF transmission is preferred because in case of the ROF method, designing a base station is relatively simple.

In an ROF transmission system, an optical modulator to convert electric signals into optical signals is essential. To enhance transmission characteristics, various modulating methods and optical modulators corresponding to the modulating methods have been studied and developed.

For example, a first conventional modulation method is to directly vary an RF carrier wave having dozens of GHz into an optical signal using a data signal at an optical modulator. To perform such an optical modulation, a lot of RF signals have to be processed and an optical modulator for a carrier wave band is necessary. However, in case of 60 GHz band, it is difficult to perform high efficiency optical modulation because of high RF loss and further, in case of such modulation, a transmission distance is limited due to chromatic dispersion between double sidebands.

A second conventional modulation method is to use two light waves, wherein a frequency difference between the two light waves is the same as a frequency of carrier wave. In detail, after generation of two light waves so that a frequency difference between the two light waves is the same as a frequency of carrier wave, one light wave is transmitted without modulation, and the other light wave is modulated and transmitted by using a data signal. Then, in a receiving-end, a signal of a carrier wave band is detected by a broadband photodiode and filtered. This method ensures easier modulation compared to the above-mentioned first conventional modulation method because it requires optical modulation for only an intermediate frequency band of several GHz. However, this method has difficulty in continuously generating light waves so that a frequency difference between the light waves is the same as a frequency of carrier wave, and is vulnerable to chromatic dispersion.

A third conventional modulation method is similar to the first conventional modulation method except that the third conventional modulation method can minimize influence of chromatic dispersion by removing one side band of a modulated signal. The third conventional modulation method is known as a single sideband (hereinafter referred to as "SSB") modulation. The SSB modulation is based on a principle that one side band is offset to be removed through the steps of dividing an RF signal having carrier wave band into two signals, conducting a 90° phase lag for one signal of them, modulating the two signals in a branched optical waveguide part of mach-zéhnder interferometer structure, respectively, and combining the modulated two light waves. However, this method also requires an optical modulator for a carrier wave band and is difficult to apply to an ROF system in spite of its advantages because of complex modulator structure and need of additional RF circuits.

Although various modulation methods and modulators have been studied, the conventional modulation method and modulators could not be easily applied to an ROF system due to imperfect features and complex system constitution. Accordingly, there is need for a new transmission method having simple and improved characteristics and a modulator corresponding to the new transmission method.

SUMMARY OF THE INVENTION

It is, therefore, a primary object of the present invention is to provide an optical modulator which can minimize an influence of chromatic dispersion and has relatively simple structure.

Another object of the present invention is to provide a method for manufacturing an optical modulator which can minimize an influence of chromatic dispersion and has relatively simple structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objectives and other advantages and in accordance with the purpose of the invention, as embodied and broadly described herein, an integrated optical modulator comprises a carrier wave band modulator using a double sideband modulation method and an intermediate frequency band modulator using a single sideband modulation method. In another aspect, a method for manufacturing the integrated optical modulator comprises preparing a substrate having at least one polarization reversed section; forming a first optical waveguide part and second optical waveguide part on the substrate, wherein the first and second optical waveguide parts have divergence and combination structure, respectively; forming a buffer layer over the optical waveguide parts; sequentially forming a first electrode and second electrode on the first optical waveguide part; and forming a third electrode on the second optical waveguide part.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
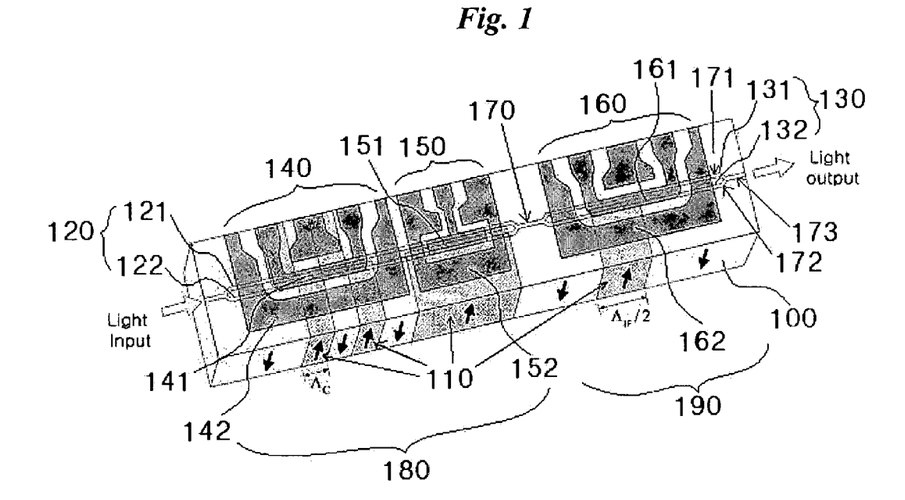
FIG. 1 is a schematic diagram showing an integrated optical modulator in accordance with a first embodiment of the present invention.

FIG. 1 is a schematic diagram showing an integrated optical modulator in accordance with a first embodiment of the present invention. Referring to FIG. 1, an integrated optical modulator comprises a z-cut $LiNbO_3$ substrate 100, at least one polarization reversed section 110 of the $LiNbO_3$ substrate 100, optical waveguide parts 120, 130 formed over the substrate 100, a buffer layer (not shown) formed over the optical waveguide parts 120, 130, and electrode parts 140, 150, 160 to control a speed of guided light passing through the optical waveguide parts 120, 130, which are formed alongside over the optical waveguide parts 120, 130.

The optical waveguide parts 120, 130 formed on the substrate 100 have a mach zehnder interferometer structure 180, 190 with divergence and combination, respectively and is connected in series each other. Over the first mach zehnder interferometer structure 180 including the first optical waveguide part 120, a first electrode part 140 for carrier wave band modulation and a second electrode part 150 for applying a DC bias are formed to compose a carrier wave band optical modulator using a double sideband modulation method.

Over the second mach zehnder interferometer structure 190 including the second optical waveguide part 130, a third electrode part 160 is disposed to compose an intermediate frequency band modulator using a single sideband modulation method. The second mach zehnder interferometer structure 190 is connected with the first mach zehnder interferometer structure 180 in series.

The first and second optical waveguide parts 120, 130 are disposed under center electrodes 141, 151, 161 of the first, second and third electrode parts 140, 150, 160. Each optical waveguide part comprises two opposite waveguides. Here, some portions of one waveguide have a different polarization direction from opposite portions of the other waveguide through a local polarization reverse.

Figure 2:
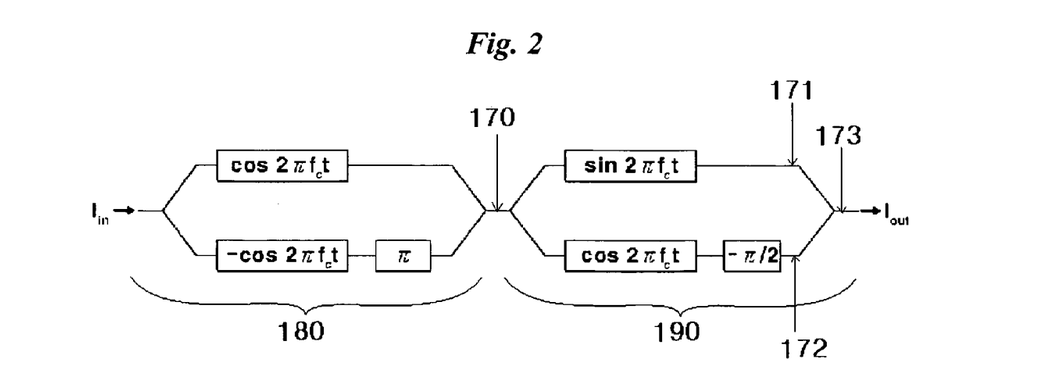
FIG. 2 is a block diagram for phase modulation by an integrated optical modulator in accordance with the present invention.
Figure 3:
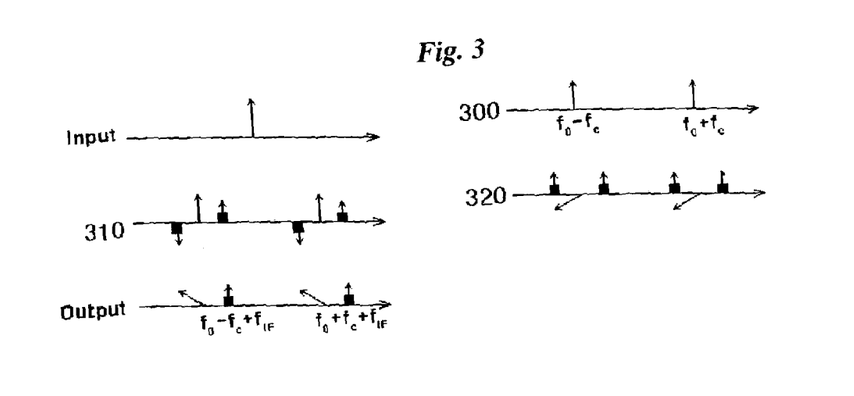
FIG. 3 shows spectrums of light waves generated from an integrated optical modulator in accordance with the present invention.

FIG. 2 is a block diagram for phase modulation by an integrated optical modulator in accordance with the present invention and FIG. 3 shows spectrums of light waves generated from an integrated optical modulator in accordance with the present invention. Referring to FIGS. 1 to 3, a light wave having the frequency of $f_0$ is entered into the first optical waveguide part 120 of the first mach zehnder interferometer structure 180.

If a single frequency signal ($\sin 2\pi f_c t$) corresponding to half of a carrier wave frequency is applied to the first electrode part 140, the same electric fields are formed at a first waveguide 121 and second waveguide 122 of the first mach zehnder interferometer structure 180.

Since the first waveguide 121 and second waveguide 122 has a different polarization direction, respectively, they cause a refractive index change in a different direction, respectively. Therefore, phase changes of the two light waves passing through the first and second waveguides 121, 122 are identical in size but different in direction. In other words, in the first waveguide 121, phase modulation of $\cos 2\pi f_c t$ is performed and in the second waveguide 122, phase modulation of $-\cos 2\pi f_c t$ is performed.

In addition, if an appropriate quantity of DC bias is applied to the second electrode part 150, the phase difference of $\pi$ is generated between the two light waves.

If the two light waves passing through the first mach zehnder interferometer structure 180 are combined at a first nodal point 170 after the above-described continuous phase change, the entered light wave having the frequency of $f_0$ is converted into a light wave having two frequencies, $f_0 - fc$ and $f_0 + f_c$.

After passing of the first nodal point 170, the converted light wave is entered into the second optical waveguide part 130 of the second mach zehnder interferometer structure 190. Here, if data of intermediate frequency band is applied to the third electrode part 160, in a third waveguide 131, phase modulation of $\sin 2\pi f_{IF} t$ is performed and, in a fourth waveguide 132, phase modulation of $\cos 2\pi f_{IF} t$ is performed.

Such phase difference of 90° between two modulated signals is generated by phase velocity mismatching between light and RF, an appropriate modulation length, and definition of polarization reversed section corresponding to the modulation length.

Figure 4:
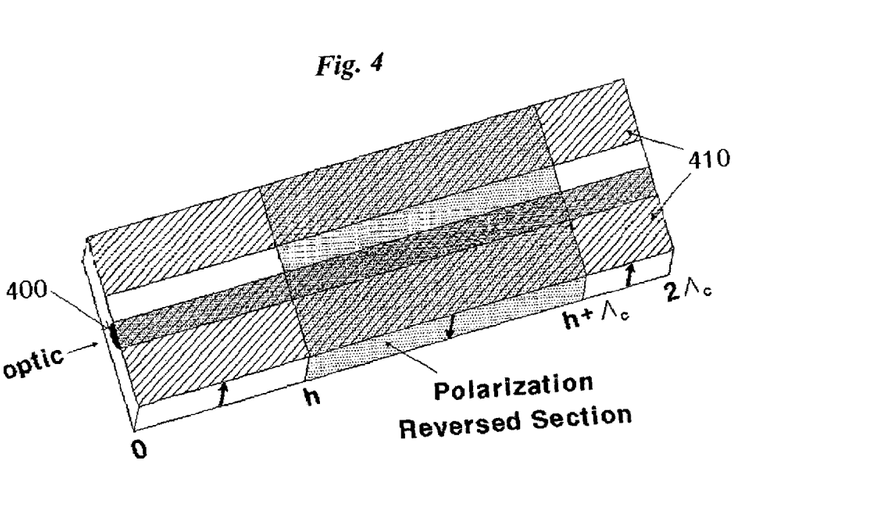
FIG. 4 is a schematic diagram illustrating a carrier wave band modulator using a double sideband modulation method in accordance with an embodiment of the present invention.
Figure 5:
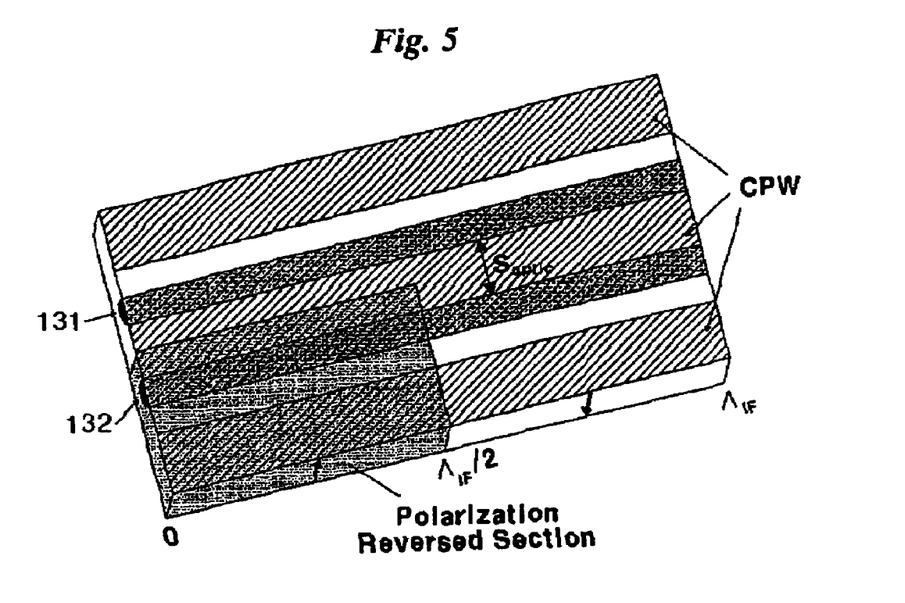
FIG. 5 is a schematic diagram illustrating an intermediate frequency band modulator using a single sideband modulation method in accordance with an embodiment of the present invention.

The above-mentioned modulation method is described in more detail referring to FIGS. 4 and 5.

A frequency spectrum at the first nodal point 170 is shown in the reference number 300 of FIG. 3. After phase modulation in the third and fourth waveguides 131, 132 and application of DC bias, frequency spectrums at third and fourth nodal points 171, 172 are shown in the reference numbers 310 and 320 of FIG. 3, respectively. After passing of the third and fourth nodal points 171, 172, the two modulated light waves are outputted as two carrier waves having a frequency of $f_0-f_c$ and $f_0+f_c$, respectively, and data signals having a $(f_0-f_c+f_{IF})$ band and $(f_0+f_c+f_{IF})$ band, respectively by interference at a fourth nodal point 173, as shown in FIG. 3.

The light wave having the above-described frequency spectrum is transmitted to a receiving-end (not shown) and is converted into RF having frequency components of $2f_c$, $2f_c+f_{IF}$, and $2f_c-f_{IF}$ through a photodiode (not shown). Here, the $2f_c+f_{IF}$ band or $2f_c-f_{IF}$ band is filtered to produce a signal having a carrier wave band to be transmitted to an antenna.

FIG. 4 is a schematic diagram illustrating a carrier wave band modulator using a double sideband modulation method in accordance with an embodiment of the present invention. Referring to FIGS. 1 and 4, an electric field of light entered into a waveguide 400, $E_0(t, z)$ and a voltage of RF applied to a coplanar waveguide (CPW) 410, V(t, z) are defined respectively as follows.

$$E_0(t,z)=e^{j(2\pi f_0 t - \beta_0 z)} \quad [\text{Equation 1}]$$

$$V(t,z)=Ae^{-\alpha_c z}\sin(2\pi f_c t - \beta_c z) \quad [\text{Equation 2}]$$

Here, $f_0$ is a frequency of a light wave entered into the waveguide 400, $f_c$ is a frequency of RF corresponding to half of a frequency of carrier wave, $\beta_0$ is a propagation constant of the light wave entered into the waveguide 400, $\beta_c$ is a propagation constant of RF, and $\alpha_c$ is an attenuation constant of RF.

By integrating voltage applied to the light wave while the light wave passes through one cycle region $(2\Lambda_c)$ including repetitively polarization reversed sections, a total effective voltage $V_{\text{eff}}$ is defined as follows.

$$\begin{aligned} V_{\text{eff}} &= \int_0^h Ae^{-\alpha_c z}\sin\left[2\pi f_c\left(t+\frac{n_0}{c}z\right)-\beta_c z\right]dz - \\ &\quad \int_h^{h+\Lambda_c} Ae^{-\alpha_c z}\sin\left[2\pi f_c\left(t+\frac{n_0}{c}z\right)-\beta_c z\right]dz + \\ &\quad \int_{h+\Lambda_c}^{2\Lambda_c} Ae^{-\alpha_c z}\sin\left[2\pi f_c\left(t+\frac{n_0}{c}z\right)-\beta_c z\right]dz \\ &= \frac{\alpha_c A}{\alpha_c^2+k^2}(1-e^{-2\alpha_c\Lambda_c})\cos(2\pi f_c t)- \\ &\quad \frac{kA}{\alpha_c^2+k^2}(1-e^{-2\alpha_c\Lambda_c})\sin(2\pi f_c t)+ \\ &\quad \frac{2kA}{\alpha_c^2+k^2}(e^{-\alpha_c h}+e^{-\alpha_c(h+\Lambda_c)})\cos(2\pi f_c t - kh)- \\ &\quad \frac{2\alpha_c A}{\alpha_c^2+k^2}(e^{-\alpha_c h}+e^{-\alpha_c(h+\Lambda_c)})\sin(2\pi f_c t - kh) \end{aligned} \quad [\text{Equation 3}]$$

Here, $\Lambda_c$ is $$\frac{c}{2f_c(n_c-n_0)},$$

k is $$\frac{\pi}{\Lambda_c},$$

c is a velocity of light in a vacuum, $n_c$ is an effective refractive index of RF, and $n_0$ is an effective refractive index of light.

If there is no RF loss during passing of CPW 410 and a total modulation length L is $2N \cdot \Lambda$, the total effective voltage $V_{\text{eff}}$ is simplified as follows.

$$V_{\text{eff}} = \frac{4NA}{k}\cos(2\pi f_c t - kh) \quad [\text{Equation 4}]$$

Referring to Equation 4, a phase of the total effective voltage $V_{\text{eff}}$ changes according to a change of starting point 'h' of polarization reverse. When starting points of polarization reverse in the two waveguides 121, 122 of the first mach zehnder interferometer structure 180 are $h_1$ and $h_2$, respectively, and it is $(h_1-h_2)=\Lambda$, a phase difference between two total effective voltages of the two waveguides 121, 122 is $\pi$.

Therefore, such a phase difference between two voltages causes phase modulation of $\cos 2\pi f_c t$ at the first waveguide 121 and phase modulation of $-\cos 2\pi f_c t$ at the second waveguide 122 although the same voltage is applied, so as to achieve a carrier wave band modulation using a double sideband modulation method.

FIG. 5 is a schematic diagram illustrating an intermediate frequency band modulator using a single sideband modulation method in accordance with an embodiment of the present invention. Referring to FIG. 1 and FIG. 5, a voltage V (t, z) of RF applied to the third electrode part 160 is defined as follows.

$$V(t,z)=Ae^{-\alpha_{IF}z}\sin(2\pi f_{IF}t-\beta_{IF}z) \quad [\text{Equation 5}]$$

Here, $f_{IF}$ is an intermediate frequency, $\alpha_{IF}$ is an attenuation constant of RF, and $\beta_{IF}$ is a propagation constant of RF.

A total effective voltage $V_{\text{eff1}}$ applied to a light wave while the light wave passes through the third waveguide 131 and total effective voltage $V_{\text{eff2}}$ applied to a light wave while the light wave passes through the fourth waveguide 132 are defined as follows.

$$\begin{aligned} V_{\text{eff1}} &= \int_0^{\Lambda_{IF}} Ae^{-\alpha_{IF}z}\sin\left[2\pi f_{IF}\left(t+\frac{n_0}{c}z\right)-\beta_{IF}z\right]dz \\ &= \frac{A\cdot\alpha_{IF}}{\alpha_{IF}^2+k^2}(1+e^{-\alpha_{IF}\Lambda_{IF}})\sin(2\pi f_{IF}t) - \\ &\quad \frac{A\cdot k}{\alpha_{IF}^2+k^2}(1+e^{-\alpha_{IF}\Lambda_{IF}})\cos(2\pi f_{IF}t) \end{aligned} \quad [\text{Equation 6}]$$

$$\begin{aligned} V_{\text{eff2}} &= -\int_0^{\frac{\Lambda_{IF}}{2}} Ae^{-\alpha_{IF}z}\sin\left[2\pi f_{IF}\left(t+\frac{n_0}{c}z\right)-\beta_{IF}z\right]dz + \\ &\quad \int_{\frac{\Lambda_{IF}}{2}}^{\Lambda_{IF}} Ae^{-\alpha_{IF}z}\sin\left[2\pi f_{IF}\left(t+\frac{n_0}{c}z\right)-\beta_{IF}z\right]dz \\ &= \frac{A}{\alpha_{IF}^2+k^2}\left(2ke^{-\alpha_{IF}\frac{\Lambda_{IF}}{2}}-\alpha_{IF}+ \right. \\ &\quad \left. \alpha_{IF}e^{-\alpha_{IF}\Lambda_{IF}}\right)\sin(2\pi f_{IF}t) + \frac{A}{\alpha_{IF}^2+k^2}\left(k-ke^{-\alpha_{IF}\Lambda_{IF}}-\right. \\ &\quad \left. 2\alpha_{IF}e^{-\alpha_{IF}\frac{\Lambda_{IF}}{2}}\right)\cos(2\pi f_{IF}t) \end{aligned} \quad [\text{Equation 7}]$$

Here, $\Lambda_{IF}$ is $$\frac{c}{2f_{IF}(n_{IF}-n_0)},$$

k is $$\frac{\pi}{\Lambda_{IF}},$$

and $n_{IF}$ is an effective refractive index of signal with an intermediate frequency band applied.

If the third electrode part 160 is no loss electrode, $V_{eff1}$ and $V_{eff2}$ may be simplified as follows.

$$V_{eff1} = \frac{2A}{k}\cos(2\pi f_{IF}t) \qquad [\text{Equation 8}]$$

$$V_{eff2} = -\frac{2A}{k}\sin(2\pi f_{IF}t) \qquad [\text{Equation 9}]$$

In Equation 4, if half of one waveguide is polarization-reversed, a phase difference between the two total effective voltages becomes $\pi/2$. Accordingly, the above-described operation can embody intermediate frequency band modulation using a single sideband modulation method.

In addition, if aside from RF a separate DC bias is applied to the third electrode part 130, a light wave passing through the fourth waveguide 132 half of which is polarization-reversed is not influenced by the DC bias, but a light wave passing through the third waveguide 131 is delayed by the DC bias. Generally, such an operation to delay a light wave is impossible at a band modulator having repetitively polarization reversed sections and, therefore, in order to embody such an operation an additional electrode for driving a DC bias has to be inserted. The insertion of additional electrode requires an additional space, thereby obstructing integration. Such a problem, however, can be solved by a structure according to the present invention.

A single sideband modulation is based on a principle that upper sidebands or lower sidebands of two light waves are offset through combination of the two light waves. Thus, to improve modulation efficiency, two total effective voltages applied to the two waveguides 131, 132 have to have the same value.

However, in an intermediate frequency band modulator using a single sideband modulation method, as an attenuation constant of RF increases, a difference between two effective voltages is generated, thereby causing deterioration of modulation characteristics.

Figure 6:
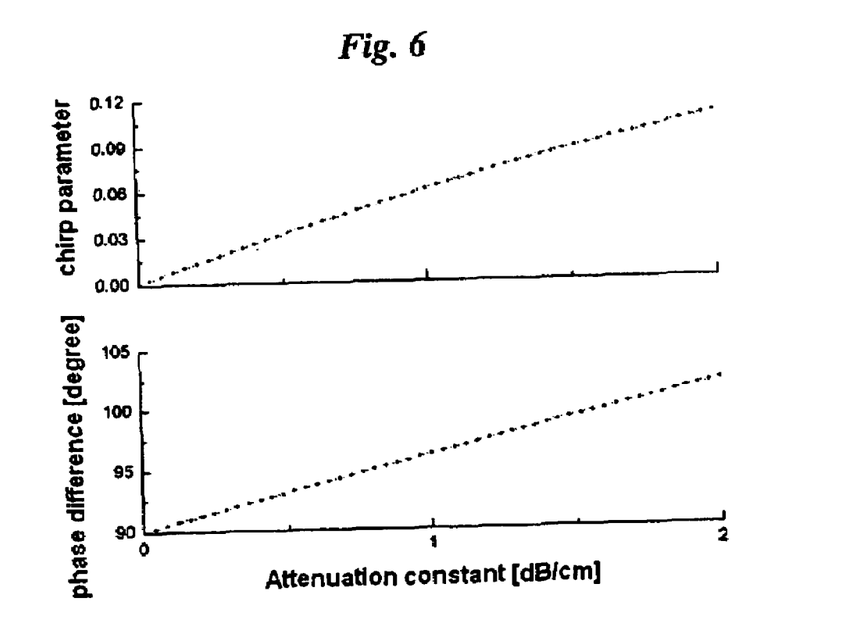
FIG. 6 is graphs illustrating operation characteristics according to RF loss change at an intermediate frequency band modulator using a single sideband modulation method in accordance with the present invention.

FIG. 6 is graphs illustrating operation characteristics according to RF loss change at an intermediate frequency band modulator using a single sideband modulation method in accordance with the present invention. A chirp parameter $\eta$ is defined as follows.

$$\eta = \frac{V_{eff2} - V_{eff1}}{V_{eff2} + V_{eff1}} \qquad [\text{Equation 10}]$$

A phase difference between $V_{eff1}$ and $V_{eff2}$ and chirp parameter according to an attenuation constant of RF are shown in FIG. 6. Referring to FIG. 6, increase in RF attenuation constant may cause increase in a chirp parameter, thereby causing distortion of characteristics of an intermediate frequency band modulator using a single sideband modulation method.

Figure 7:
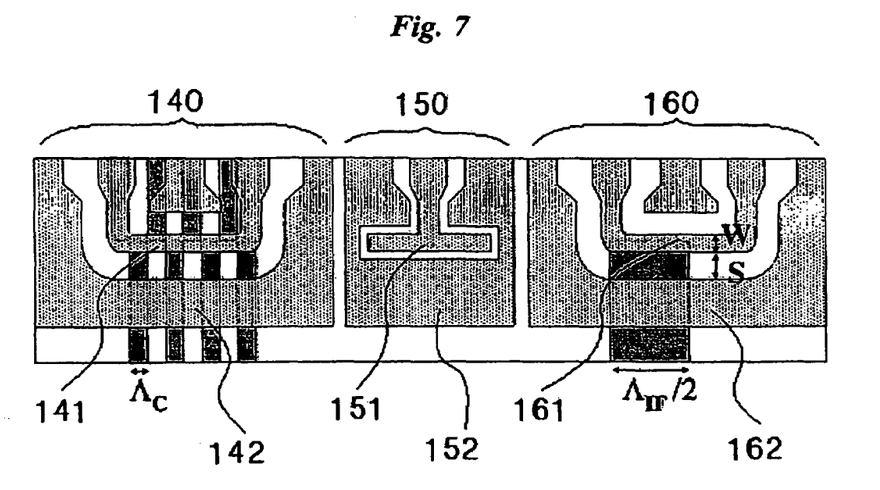
FIG. 7 is a plan view of an integrated optical modulator in accordance with a second embodiment of the present invention.

FIG. 7 is a plan view of an integrated optical modulator in accordance with a second embodiment of the present invention. Referring to FIG. 7, a $SiO_2$ buffer layer and electrode parts 140, 150, 160 may have a thickness of 0.3 μm and 2 μm, respectively. Parameters W and S are 40 μm and 60 μm, respectively. With such a structure, a calculated characteristic impedance is 40Ω, an effective refractive index is 3.93, and an attenuation constant is 0.7 dB/cm. In this case, if a frequency of carrier wave is 60 GHz, an input frequency into a carrier wave band modulator using a double sideband modulation method is 30 GHz, $\Lambda_c$ (length of polarization reversed section) calculated using an effective refractive index is 2.8 mm, and a total modulation region is 22.4 mm corresponding to four cycles of cyclical polarization. In addition, in a 5.5 GHz intermediate frequency band modulator using a sing sideband modulation method, a length $\Lambda_{IF}$ of modulation region is 15.2 mm.

Figure 8:
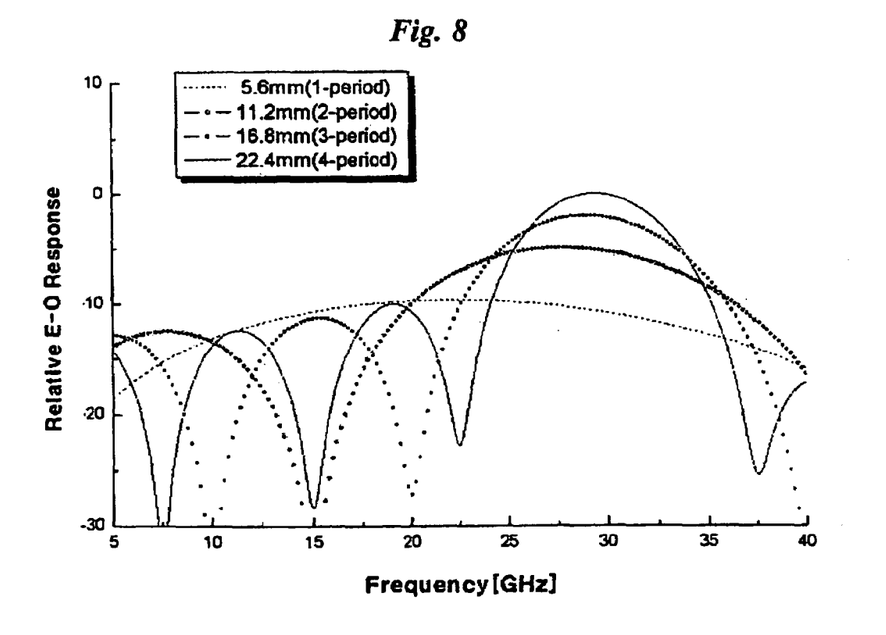
FIG. 8 is graphs illustrating frequency response characteristics of a carrier wave band modulator using a double sideband modulation method according to the second embodiment of the present invention.

FIG. 8 is graphs illustrating frequency response characteristics of a carrier wave band modulator using a double sideband modulation method according to the second embodiment of the present invention. Referring to FIG. 8, as the number of times of polarization reverse increases, a bandwidth of carrier wave is reduced.

Figure 9:
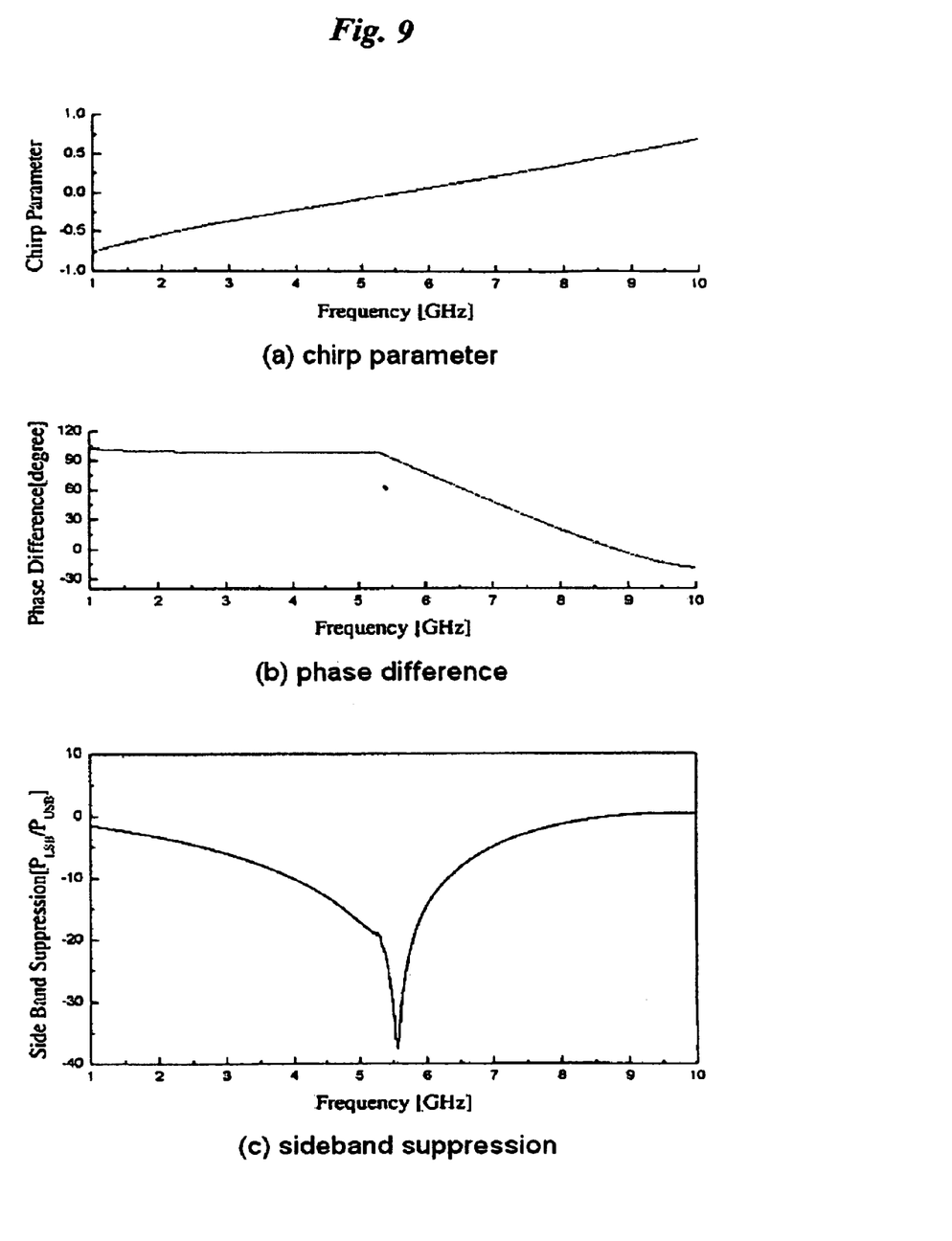
FIG. 9 is graphs depicting operation characteristics according to a frequency at an intermediate frequency band modulator using a single sideband modulation method according to the second embodiment of the present invention.

FIG. 9 is graphs depicting operation characteristics according to a frequency at an intermediate frequency band modulator using a single sideband modulation method according to the second embodiment of the present invention. Referring to FIG. 9, in a 5.5 GHz intermediate frequency band modulator, a chirp parameter (FIG. 9(*a*)), a phase difference (FIG. 9(*b*)), and ratio of two sideband signals (FIG. 9(*c*)) according to a frequency are calculated and graphed.

Accordingly, by connecting a carrier wave band modulator using a double sideband modulation method and an intermediate frequency band modulator using a single sideband modulation method in series, the present invention embodies an integrated optical modulator which can generate a carrier wave through polarization reverse technology and derivation of virtual RF phase change by such polarization reverse.

In addition, the integrated optical modulator according to the present invention can produce a modulated light wave having a spectrum without influence of chromatic dispersion and perform drive by a DC bias as well as it plays a role of band modulator.

It is noted that this patent claims priority from Korean Patent Application Serial Number 10-2005-0074320, which was filed on Aug. 12, 2005, and is hereby incorporated by reference in its entirety.

Although certain example methods, apparatus and articles of manufacture have been described herein, the scope of coverage of this invention is not limited thereto. On the contrary, this patent covers all methods, apparatus and articles of manufacture fairly falling within the scope of the appended claims either literally or under the doctrine of equivalents.

What is claimed is:

1. An integrated optical modulator comprising an input optical waveguide part for inputting light to the integrated optical modulator, an output optical waveguide part for outputting modulated light from the integrated optical modulator, a double sideband suppressed carrier modulator for modulating light according to a first frequency signal, and a single sideband modulator for modulating light outputted from the double sideband suppressed carrier modulator according to a second frequency signal, wherein the double sideband suppressed carrier modulator comprises:

a substrate having cyclically polarization reversed sections;

a first optical waveguide part disposed on the substrate, the first optical waveguide part being connected to the input optical waveguide part and comprising a first waveguide, a second waveguide, a first divergence part in which the first waveguide and the second waveguide diverge from the input optical waveguide part, and a first combination part in which the first waveguide and the second waveguide combine and the first optical waveguide part is connected in series to the single sideband modulator;

a first electrode part formed over the first and second waveguides near the first divergence part and applying the first frequency signal; and a second electrode part formed over the first and second waveguides near the first combination part, wherein the substrate has different polarization directions in areas adjacent to the first waveguide and the second waveguide.

2. The integrated optical modulator as defined by claim 1, wherein the first frequency signal corresponds to half of a frequency of a carrier wave and the second electrode part receives a DC bias, so as to perform a carrier wave band modulation using a double sideband suppressed carrier modulation method.

3. The integrated optical modulator as defined by claim 1, wherein the single sideband modulator comprises:

a substrate having a polarization reversed section;

a second optical waveguide part disposed on the substrate, the second optical waveguide part comprising a third waveguide on the polarization reversed section, a fourth waveguide, a second divergence part in which the third waveguide and the fourth waveguide diverge from the first combination part, and a second combination part in which the third waveguide and the fourth waveguide combine and the output optical waveguide part is connected to the third waveguide and the fourth waveguide; and a third electrode part disposed over the third waveguide and the fourth waveguide.

4. The integrated optical modulator as defined by claim 3, wherein the polarization reversed section takes up half the fourth waveguide.

5. The integrated optical modulator as defined by claim 3, wherein the third electrode part receives data of the second frequency signal having an intermediate frequency band so as to perform intermediate frequency band modulation using a single sideband modulation method.

6. The integrated optical modulator as defined by claim 3, wherein the third electrode part receives a DC bias so as to delay a light wave passing through the third waveguide.

* * * * *